United States Patent [19]
Tanno et al.

[11] 3,816,255
[45] June 11, 1974

[54] PROCESS FOR PRODUCING L-LYSINE BY FERMENTATION

[76] Inventors: Kazunobu Tanno, 19-5-2 Takasuzucho; Yoichi Ikeno, 5 Naka Narusawacho 1 Chome, both of Hitachi-shi, Japan

[22] Filed: May 1, 1972

[21] Appl. No.: 249,344

[30] Foreign Application Priority Data
May 12, 1971 Japan.............................. 46-31151
Sept. 1, 1971 Japan.............................. 46-66579

[52] U.S. Cl..................................... 195/30, 195/29
[51] Int. Cl............................................. C12d 13/06
[58] Field of Search................................ 195/30, 47

[56] References Cited
UNITED STATES PATENTS
3,687,810 8/1972 Kurihara et al.......................... 195/47
3,707,441 12/1972 Shiio et al............................... 195/30

*Primary Examiner*—Alvin E. Tanenholtz
*Attorney, Agent, or Firm*—Craig & Antonelli

[57] ABSTRACT

L-lysine is produced by cultivating *Brevibacterium divaricatum* HC-615 (FERM-P No. 928; ATCC No. 21792) or *Corynebacterium lilium* HC-B020 (FERM-P No. 973; ATCC No. 21793) in a medium containing 10 percent (W/V) benzoic acid in the form of ammonium salt as a carbon source at 20° to 37°C and a pH of 5 to 9 for 48 to 96 hours under aerobic conditions without any amino acid requirement, forming and accumulating L-lysine therein, and recovering the same from the resulting culture broth.

8 Claims, No Drawings

PROCESS FOR PRODUCING L-LYSINE BY FERMENTATION

This invention relates to a novel process for producing L-lysine, and more particularly to a process for producing L-lysine, which comprises cultivating L-lysine-producing microorganism free from an amino acid requirement and belonging to the genus Brevibacterium or Corynebacterium in a medium containing benzoic acid as a carbon source under aerobic conditions, forming and accumulating L-lysine in the medium, and recovering L-lysine from the medium.

An object of the present invention is to form and accumulate a considerable amount of L-lysine directly from a cheap petrochemical product as a carbon source thereby to produce L-lysine advantageously in an industrial scale.

Heretofore, the production of L-lysine by fermentation has been carried out by forming and accumulating L-lysine in the medium using a mutant strain requiring amino acids for growth, that is, a strain requiring homoserine, or both threonine and methionine, or both threonine and cystathionine, or both threonine and homocysteine of L-glutamic acid-producing microorganism, Micrococcus glutamicus. However, according to the conventional process, sugar materials have been utilized as raw materials, and therefore the conventional process is not always advantageous in an industrial sense (Japanese Patent Publication No. 6499/61; U.S. Pat. No. 2,979,439).

The present inventors have made study of industrially advantageous processes for producing L-lysine by fermentation, using cheap petrochemical products as a carbon source, and as a result have found that a strain belonging to the genus Brevibacterium or Corynebacterium can produce a considerable amount of L-lysine, when cultivated in a medium containing benzoic acid as a carbon source and further a nitrogen source and inorganic salts without any requirement for amino acid, and have accomplished the present invention.

The microorganisms capable of producing L-lysine used in the present invention are mutant strains free from amino acid requirement which belong to the genus Brevibacterium or Corynebacterium. These mutant strains free from the amino acid requirement can be obtained by applying to their parent microorganisms a mutation treatment by irradiation of ultraviolet rays, X-rays, radioactive rays or by mutating agent, or the like. For example, the typical strains used in the present invention, Brevibacterium divaricatum HC-615 and Corynebacterium lilium HC-B020 were obtained by mutation treatment of their respective parent strains, Brevibacterium divaricatum NRRL B-2312 and Corynebacterium lilium NRRL B-2243 with a mutating agent, N-methyl-N'-nitro-N-nitrosoguanidine.

Said mutant strains Brevibacterium divaricatum HC-615 and Corynebacterium lilium HC-B020 were deposited with Fermentation Research Institute, Agency of Industrial Science and Technology, No. 8-1 Inage, Higashi-5-chome, Chiba-shi, Chiba-ken, Japan, a public depository, respectively, under accession numbers FERM-P No. 928 and No. 973, and also deposited with American Type Culture Collection, 12301 Parklawn Drive, Rockville, Md., USA, respectively, under accession numbers ATCC No. 21792 and No. 21793.

As a result of clarification of the L-lysine accumulation phenomena by amino acid requiring mutant strains of L-glutamic acid-producing microorganisms, a concerted feedback inhibition by threonine and lysine works against $\beta$-aspartokinase, the first important enzyme in the lysine biosynthesis path ways. In that case, it has been clarified that the inhibition hardly takes place when any one of these amino acids is deficient. That is to say, when said amino acid-requiring strain is cultured while controlling the amount of L-threonine and there brings about a threonine starvation in the cells, the inhibition upon $\beta$-aspartokinase can be eliminated and the excess production of L-lysine seems to take place.

However, Brevibacterium divaricatum HC-615 (FERM-P No. 928: ATCC No. 21792), a mutant strain derived from Brevibacterium divaricatum NRRL B-2312, and Corynebacterium lilium HC-B020 (FERM-P No. 973: ATCC No. 21793), a mutant strain derived from Corynebacterium lilium NRRL B-2243, which are used in the present invention, have none of said amino acid requirement for accumulating L-lysine. Further, these mutant strains can accumulate a considerable amount of L-lysine, even when cultivated in a medium containing a large amount of L-threonine or other amino acids.

Results of study on a relation between changes in the concentration of L-threonine added and yield of L-lysine by the mutant strains used in the present invention are shown in Table 1.

Table 1

Relation between the concentration of L-threonine added and the yield of L-lysine

| Strains | Brevibacterium divaricatum HC-615 (FERM-P No. 928; ATCC No. 21792) | Corynebacterium lilium HC-B020 (FERM-P No. 973; ATCC No. 21793 |
|---|---|---|
| Amount of L-threonine added | L-lysine yield (monohydrochloride) | L-lysine yield (monohydrochloride) |
| 0 (mg/ml) | 20.3 (mg/ml) | 15.4 (mg/ml) |
| 0.1 | 22.1 | 15.9 |
| 0.2 | 20.6 | 14.8 |
| 0.4 | 21.3 | — |
| 0.5 | — | 16.7 |
| 1.0 | 20.8 | 16.0 |
| 2.5 | 19.4 | — |
| 5.0 | 20.1 | 15.3 |
| 10.0 | 20.3 | 15.7 |

Note:
The foregoing results as shown in Table 1 were obtained according to the following procedure:

L-threonine was added to a medium having a composition as shown below, so that L-threonine might take the respective concentrations as shown in Table 1, and 20 ml of the medium was placed into each shaking flask having a capacity of 500 ml, and sterilized according to the ordinary procedure. Then, one loop of Brevibacterium divaricatum HC-615 (FERM-P No. 928; ATCC No. 21792) or Corynebacterium lilium HC-B020 (FERM-P No. 973; ATCC No. 21793) was inoculated therein, and incubated at 30°C for 72 hours with shaking. The resulting culture broth was microbioassayed.

Medium composition:

| | |
|---|---|
| Ammonium benzoate (as benzoic acid) (Initially 1.0 %, and successively 1.0 % added in split manner) | 10.0 % |
| K₂HPO₄ | 0.1 % |
| MgSO₄·7H₂O | 0.05 % |
| FeSO₄·7H₂O | 0.0005 % |
| MnSO₄·4H₂O | 0.0005 % |
| d-biotin | 100 µg/l |
| thiamine monohydrochloride | 100 µg/l |

In the medium used in the present invention, such organic acids as benzoic acid, acetic acid, citric acid, etc., and carbohydrates can be employed as a carbon source, but L-lysine can be produced in high yield when benzoic acid is employed. As a nitrogen source, such inorganic and organic nitrogens as ammonium sulfate, urea, ammonium nitrate, ammonium chloride, liquid ammonia, etc., are employed. In addition, it is desirable in accumulation of a considerable amount of L-lysine to add a proper amount of such proteinic organic materials as peptone, meat extract, yeast extract, corn steep liquor, soybean meal hydrolysate, etc., because the present strains can accumulate a large amount of L-lysine, irrespective of the concentration of L-threonine added. In addition, potassium phosphate, magnesium salts, iron salts, and manganese salts are used in a proper amount as inorganic salts.

Cultivation is carried out under aerobic conditions according to the ordinary shaking cultivating procedure, aeration-stirring cultivating procedure, or the like. Cultivating temperature is about 20° to 37°C. During the cultivation, pH is adjusted to about 5 to 9. Cultivating time is about 48 to 96 hours, and a considerable amount of L-lysine is accumulated in the medium.

After the completion of cultivation, cells are removed from the resulting culture broth by centrifuge, and the filtrate is passed through strong cation exchange resin of $NH_4^+$ form, Amberlite IR120 (a trademark of Rohm and Haas Co., USA) for adsorption. The resin is then washed with water, and subjected to elution with dilute ammonia water. A fraction containing L-lysine is collected, concentrated under a reduced pressure to remove ammonia therefrom, adjusted to pH 4.0 with hydrochloric acid, and again concentrated under a reduced pressure, whereby L-lysine monohydrochloride is deposited.

Now, the present invention will be explained in detail, referring to Examples.

EXAMPLE 1

A medium having a composition of 1.0 % ammonium benzoate, 0.1 % K₂HPO₄, 0.05 % MgSO₄·7H₂O, 0.0005 % FeSO₄·7H₂O, 0.0005 % MnSO₄·4H₂O, 100 µg/l of d-biotin, 100 µg/l of thiamine monohydrochloride, and 0.5 % corn steep liquor was adjusted to pH 7.0 to 7.5 with ammonia water, and 20 ml of the medium was placed in each shaking flask having a capacity of 500 ml, and sterilized at 121°C for 10 minutes. The medium in the flasks was inoculated with 5 % bouillon preculture broth of *Corynebacterium lilium* HC-B020 (FERM-P No. 973; ATCC No. 21793) obtained through shaking cultivation at 30°C for 24 hours, and subjected to shaking cultivation with 120 reciprocations per minute. Benzoic acid as a carbon source was added to the medium in the form of ammonium salt successively at 1 percent concentration, and after 60 hours from the start of cultivation total 10 percent (W/V) thereof as benzoic acid was added thereto. Then, the cultivation was completed.

Determination of the amount of L-lysine accumulated in the culture broth after the completion of fermentation by microbioassay method revealed that 40.6 g/l of L-lysine monohydrochloride was formed. After the removal of cells from the culture broth by centrifuge, crystals were collected by the ordinary ion exchange resin method, whereby 37.3 g/l of L-lysine monohydrochloride was obtained.

EXAMPLE 2

5 l of a medium having the same composition as in Example 1 was charged into a jar fermentor having a capacity of 10 l, and sterilized according to the ordinary procedure. Then, the medium in the jar fermentor was inoculated with 5 % preculture solution of *Corynebacterium lilium* HC-B020 (FERM-P No. 973; ATCC No. 21793) and cultivated with stirring at 400 rpm, and aeration of 0.5 V.V.M. at a cultivating temperature of 30°C. While adjusting a pH to 7.0 to 8.5, substrate benzoic acid was added thereto successively at 1 percent (W/V) concentration in the form of ammonium salt, and total 10 percent (W/V) of benzoic acid was added thereto after 48 hours from the start of cultivation. Then, the cultivation was finished. Determination of the amount of L-lysine accumulated in the resulting culture broth by microbioassay method revealed that 38.8 g/l of L-lysine monohydrochloride was produced.

After the removal of cells from the culture broth by centrifuge, a ninhydrin-positive fraction was collected by the ordinary ion exchange resin method, and concentrated under a reduced pressure, and crystals were collected, whereby 35.4 g/l of L-lysine monohydrochloride was obtained.

EXAMPLE 3

A medium having a composition of 1.0 % ammonium benzoate, 0.1 % K₂HPO₄, 0.05 % MgSO₄·7H₂O, 0.0005 % FeSO₄·7H₂O, 0.0005 % MnSO₄·4H₂O, 100 µg/l of d-biotin, 100 µg/l of thiamine monohydrochloride, and 0.5 % corn steep liquor was prepared, and adjusted to pH 7.0 to 7.5 with ammonia water. 20 ml of the medium was placed in each flask having a capacity of 500 ml, and sterilized at 120°C for 10 minutes.

The medium in the flasks was inoculated with 5 % bouillon preculture broth of *Brevibacterium devaricatum* HC-615 (FERM-P No. 928; ATCC No. 21792) obtained through shaking cultivation at 30°C for 24 hours, and cultivated with shaking at 120 reciprocations per minute.

Benzoic acid as a carbon source was added thereto successively at 1 percent (W/V) concentration in the form of ammonium salt, and total 10 percent (W/V) thereof was added thereto after 60 hours from the start of cultivation. Then, the cultivation was finished. Determination of the amount of L-lysine accumulated in the resulting culture broth by microbioassay method revealed that 45.8 g/l of L-lysine hydrochloride was formed. After the removal of cells from the resulting culture broth by centrifuge, crystals were collected by the ordinary ion exchange resin method, whereby 40.3 g of L-lysine hydrochloride was obtained from 1 l of the culture broth.

EXAMPLE 4

5 l of the medium having the same composition as in Example 3 was charged into a jar fermentor having a capacity of 10 l, and sterilized according to the ordinary procedure. The medium was inoculated with 5 % preculture solution of Brevibacterium divaricatum HC-615 (FERM-P No. 928; ATCC No. 21792), and cultivated with stirring at 400 rpm, and aeration of 0.5 V.V.M. at a cultivating temperature of 30°C. while adjusting a pH to 7.0 to 8.5, substrate benzoic acid was added thereto successively at 1 % (W/V) concentration in the form of ammonium salt, and total 10 % (W/V) of benzoic acid was added thereto after 48 hours from the start of cultivation. Then, the cultivation was finished. Determination of the amount of L-lysine accumulated in the resulting culture broth by microbioassay method revealed that 42.3 g/l of L-lysine monohydrochloride was produced.

After the removal of cells from the culture broth by centrifuge, a ninhydrin-positive fraction was collected by the ordinary ion exchange resin method, and concentrated under a reduced pressure, and crystals were collected, whereby 38.0 g/l of L-lysine monohydrochloride was obtained.

As described above, a cheap petrochemical product, benzoic acid, is used in the present invention in place of the conventional sugar materials as a carbon source, and accordingly there is no unfavorable influence due to contamination of foreign matters contrary to the case where the sugar materials are used as a carbon source, and L-lysine can be produced cheaply and advantageously in an industrial scale.

What is claimed is:

1. A process for producing L-lysine, which comprises cultivating a L-lysine-producing microorganism free from amino acid requirement and belonging to the genus *Brevibacterium* or *Corynebacterium* in a medium containing benzoic acid as a carbon source under aerobic conditions, forming and accumulating L-lysine in the medium, and recovering L-lysine from the medium.

2. A process according to claim 1, wherein the microorganism belonging to species *Brevibacterium divaricatum* or *Corynebacterium lilium* is used.

3. A process according to claim 2, wherein the microorganism is a strain *Brevibacterium divaricatum* HC-615 (FERM-P No. 928; ATCC No. 21792) or *Corynebacterium lilium* HC-B020 (FERM-P No. 973; ATCC No. 21793).

4. A process according to claim 1, wherein the benzoic acid is in the form of ammonium salt.

5. A process according to claim 1, wherein the medium contains 10 percent (W/V) benzoic acid in the form of ammonium benzoate.

6. A process according to claim 1, wherein the cultivation is carried out at 20° to 37°C, and a pH of 5 to 9 for 48 to 96 hours.

7. A process for producing L-lysine, which comprises cultivating *Brevibacterium divaricatum* HC-615 (FERM-P No. 928; ATCC No. 21792) or *Corynebacterium lilium* HC-B020 (FERM-P No. 973; ATCC No. 21793) in a medium containing benzoic acid in the form of ammonium salt as a carbon source at 20° to 37°C. and a pH of 5 to 9 for 48 to 96 hours under aerobic conditions, forming and accumulating L-lysine in the medium, and recovering L-lysine from the medium.

8. A process according to claim 7, wherein the medium contains 10 percent (W/V) benzoic acid in the form of ammonium benzoate.

* * * * *